Figure 1:
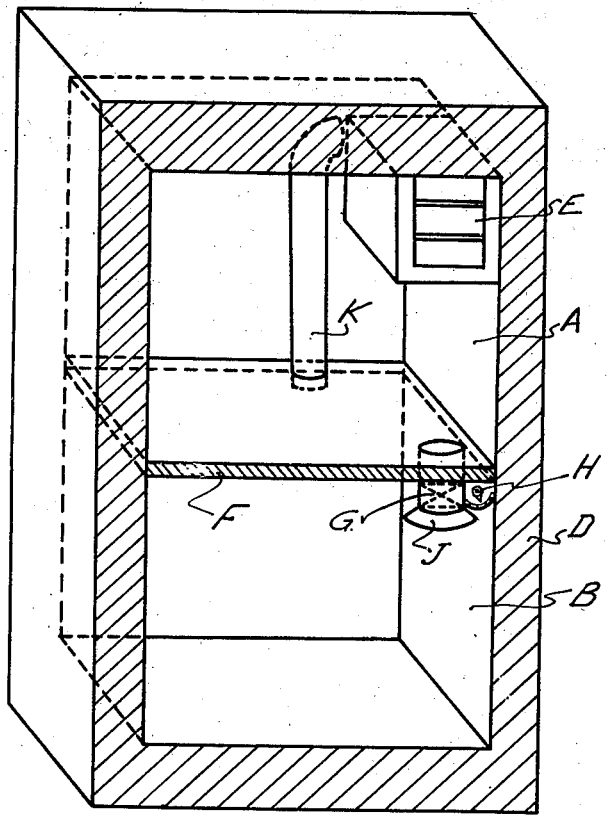

May 6, 1941.   L. J. BRAIN   2,240,882
REFRIGERATOR
Filed Oct. 26, 1938

INVENTOR
L. J. BRAIN
By Young, Emery & Thompson
ATTYS.

Patented May 6, 1941

2,240,882

UNITED STATES PATENT OFFICE 2,240,882

REFRIGERATOR

Lester Joseph Brain, Bellevue Hill, Sydney,
New South Wales, Australia

Application October 26, 1938, Serial No. 237,159
In Australia October 29, 1937

3 Claims. (Cl. 62—89)

At present, with refrigerators, the cooling unit is mounted near the top of the cooling chamber and a predetermined temperature is maintained therein by mechanical and/or other means. With such refrigerators the cooling chamber has a temperature fixed within limits, and generally these limits are applicable for the preservation of meat and other perishable goods, such temperature being low. The result is that when a variety of articles is stored in the cooling chamber the temperature is suitable for some articles but less suitable for others such as liquids and butter. Whereas it is desirable to freeze ice cream and keep meat very cold, it is not usually necessary to keep butter very cold and it is desirable to have beverages only nicely cool.

The object of this invention is to provide a refrigerator or the like which will have two or more cooling chambers, one, the main chamber which is cooled by a cooling unit, and another or subsidiary chamber or chambers which is or are adjacent the main chamber and is or are at predetermined higher temperature or temperatures, said other subsidiary chamber or chambers being cooled from the main chamber and not by separate or independent cooling units.

According to the invention a refrigerator has a main cooling chamber of usual construction and one or more subsidiary chambers. The subsidiary and main chambers are in communication by means of valves or the like so that cold air from the main chamber may proceed to a subsidiary chamber when the temperature in the latter rises beyond a predetermined limit and is automatically shut off or controlled in volume when the desired degree of coldness is attained and is being maintained in the said subsidiary chamber. The warmer air from the subsidiary chamber passes to the top of the main chamber during the time the cold air from the main chamber is proceeding to the subsidiary chamber. This maintenance of an uniform higher temperature in the subsidiary chamber is accomplished by the thermostatic control of a valve or the like between the main and subsidiary chambers. Such valve or the like and thermostatic means may be of the conventional type, and the insulation between the main and subsidiary chambers may be efficient or even somewhat inefficient provided the main insulation around the outside of the chambers is efficient. Furthermore the valve or the like may or may not be air-tight, slight leaks not interfering with the cooling of the main or subsidiary chambers. These features enable the invention to be applied to household and store refrigerators very cheaply whilst the provision of two or more chambers at different temperatures improves the efficiency of a refrigerator.

It will be found that greater efficiency in the use of the invention may be had by mounting the valves in pipes between the main and subsidiary chambers; for example one pipe may proceed from near the top of the subsidiary chamber to a position adjacent the cooling unit of the main chamber and another pipe may lead from the bottom of the main chamber to the subsidiary chamber. By these means the relatively warmer air from the subsidiary chamber proceeds to the position in the main chamber where it will least affect the efficiency, and the cold air from the main chamber proceeds down into the subsidiary chamber. It will be understood that the main chamber should preferably not be located lower than the subsidiary chamber or chambers.

The invention enables a refrigerator to be supplied for household, store or other use, in the main chamber of which meat and other substances requiring low temperatures may be stored, and in the subsidiary chamber or chambers of which other articles, which need only be cool, may be stored.

The type of valve to be used will vary and may be either butterfly, oval, circular, square or other shape as required by the refrigerator size, type or use.

Such valves may be in the floor of the upper chamber or in the walls of either or both chambers, being in a channel or duct connecting both chambers.

Although in the drawing the valve thermostatically controlled is shown in the floor of the main chamber, it will be understood that the said valve or valves will be moved by mechanical, electrical, or electro-mechanical means controlled by a thermostat or thermostats.

Figure 2:
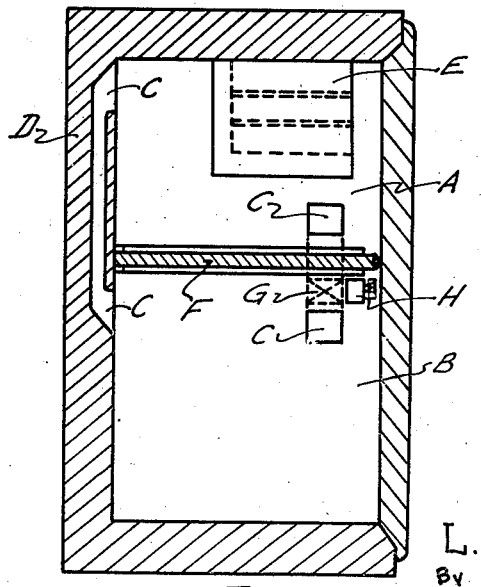

Reference will now be made to the accompanying drawing wherein:

Figure 1 is a pictorial sectional elevation of a refrigerating chamber embodying the invention; and Figure 2 is a sectional side elevation of a refrigerating chamber embodying a modified form of the invention.

Referring to Figure 1: A is the main cooling chamber, B is the subsidiary chamber and D the outer fully insulated walls. The cooling unit E is located near the top of chamber A in the conventional manner and functions as usual.

The division piece F may be fixed or movable and is not necessarily fully insulated. In the division piece F and preferably beneath cooling unit E a thermostatically operated valve G is located, the thermostat H being within chamber B. A truncated conical exit J may be provided. Leading through division piece F a pipe K from chamber B proceeds up to a position in chamber A adjacent cooling unit E.

In use the thermostat H is set to open and close valve G at predetermined temperatures in chamber B which will be higher than that obtaining in chamber A. Upon the opening of the said valve G, cold air from chamber A will gravitate into chamber B at the same time displacing warmer air from chamber B to the top of chamber A near cooling unit E. If desired, a thermostatically operated valve may be located in pipe K. Furthermore, more than one thermostatically operated inlet valve may be used and more than one thermostatically or pressure operated valve in pipe K may be used as is necessary in the conditions sought. In lieu of pipe K and valvular aperture G a system of ducts C and thermostatically controlled valves G in the wall D or floor F may be used as shown in Figure 2. Division piece F may be fixed or movable. One door for closing both chambers A and B may be employed, but separate doors, one for each chamber can be used. This would avoid as much as possible interference with chamber A when chamber B is being used.

I claim:

1. A refrigerator comprising an upper chamber, a lower chamber, a vertically adjustable horizontal partition separating the upper and lower chambers and forming the bottom wall of the upper chamber and the top wall of the lower chamber, a refrigerator unit in the upper chamber, a duct extending from the upper surface of said partition down through said partition into the lower chamber for conducting cold air from the upper chamber into the lower chamber, a valve in said duct, thermostatically controlled means for actuating said valve, and a duct extending through said partition up to a zone near the upper portion of the refrigerating unit.

2. A refrigerator comprising a chamber having thick walls, a refrigerating unit in the upper portion of the chamber, a horizontal partition in said chamber dividing the latter into upper and lower chambers, a duct in the wall of said chamber having an inlet above said partition and an outlet beneath said partition for the flow of cold air from above to beneath said partition, a valve in said duct, means responsive to the temperature in said lower chamber for controlling said valve, and a second duct in the wall of said chamber having an inlet beneath said partition and an outlet above said partition near the upper portion of said chamber for conducting warm air for the lower chamber to a region near the upper portion of said refrigerating unit.

3. A refrigerator according to claim 2 in which the partition is vertically adjustable.

LESTER JOSEPH BRAIN.